United States Patent [19]

Berger et al.

[11] 4,150,568
[45] Apr. 24, 1979

[54] APPARATUS AND METHOD FOR DOWN HOLE VIBRATION SPECTRUM ANALYSIS

[75] Inventors: Eugene L. Berger, Houston; Marion M. Ringo, League City, both of Tex.

[73] Assignee: General Electric Company, Fairfield, Conn.

[21] Appl. No.: 891,010

[22] Filed: Mar. 28, 1978

[51] Int. Cl.$^2$ ............................................. E21B 47/00
[52] U.S. Cl. ......................................... 73/151; 73/659
[58] Field of Search ..................... 73/659, 151; 175/39, 175/40, 50

[56] References Cited
U.S. PATENT DOCUMENTS 3,626,482  12/1971  Quichaud et al. ................. 73/151 X
3,703,096  11/1972  Vitter, Jr. et al. ..................... 73/151

Primary Examiner—Jerry W. Myracle
Attorney, Agent, or Firm—Raymond H. Quist; Allen E. Amgott

[57] ABSTRACT

An apparatus and a method are provided for detecting and measuring vibrations of a selected portion of a drill string in a bore hole. The vibrations are detected by a transducer which produces an electrical signal representative of the vibrations. The signal is applied to a band-pass filter which produces an output signal representative of vibrations occurring at frequencies within the pass band of the filter. The pass band is repetitively stepped through a predetermined frequency range under the control of digital circuitry.

13 Claims, 5 Drawing Figures

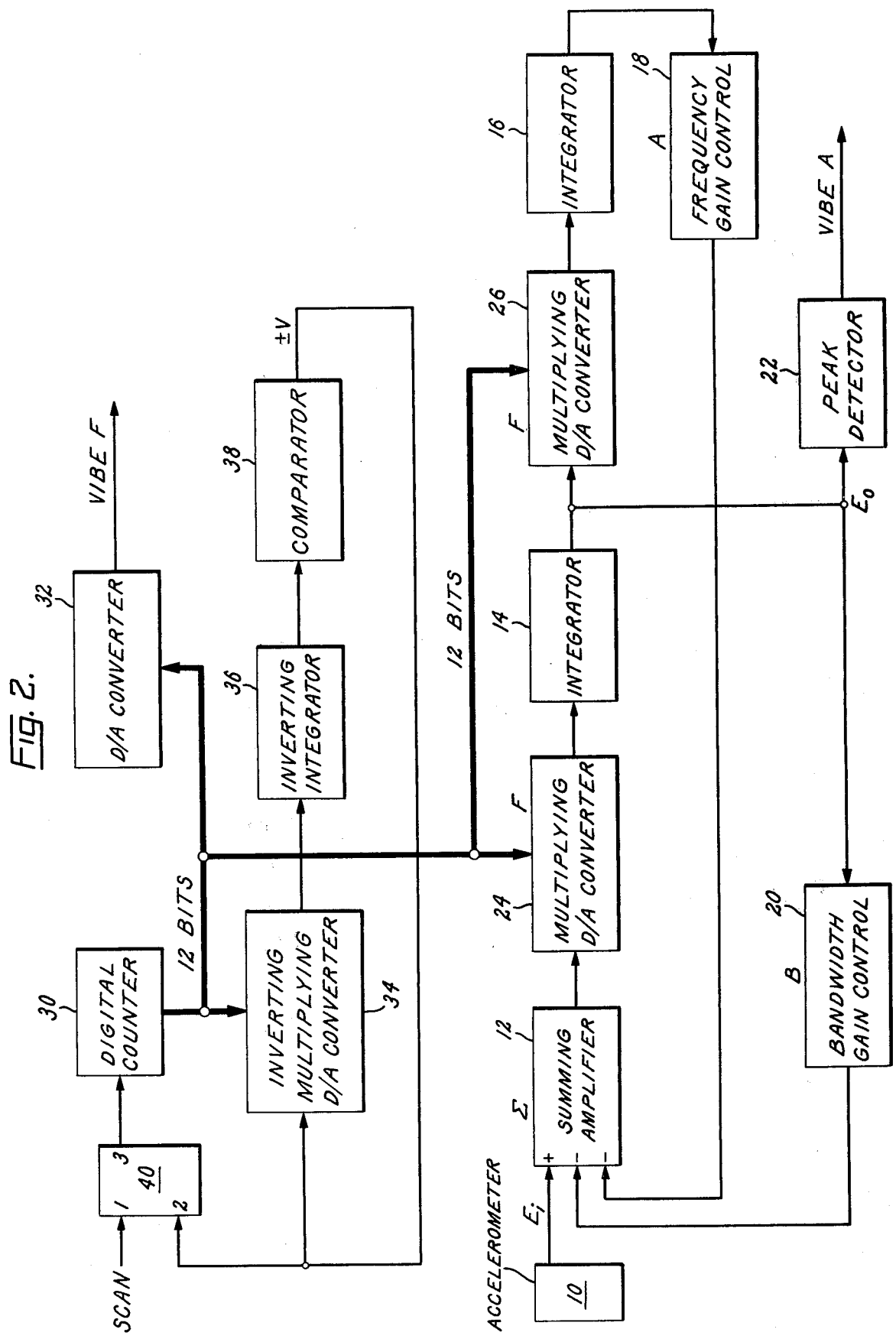

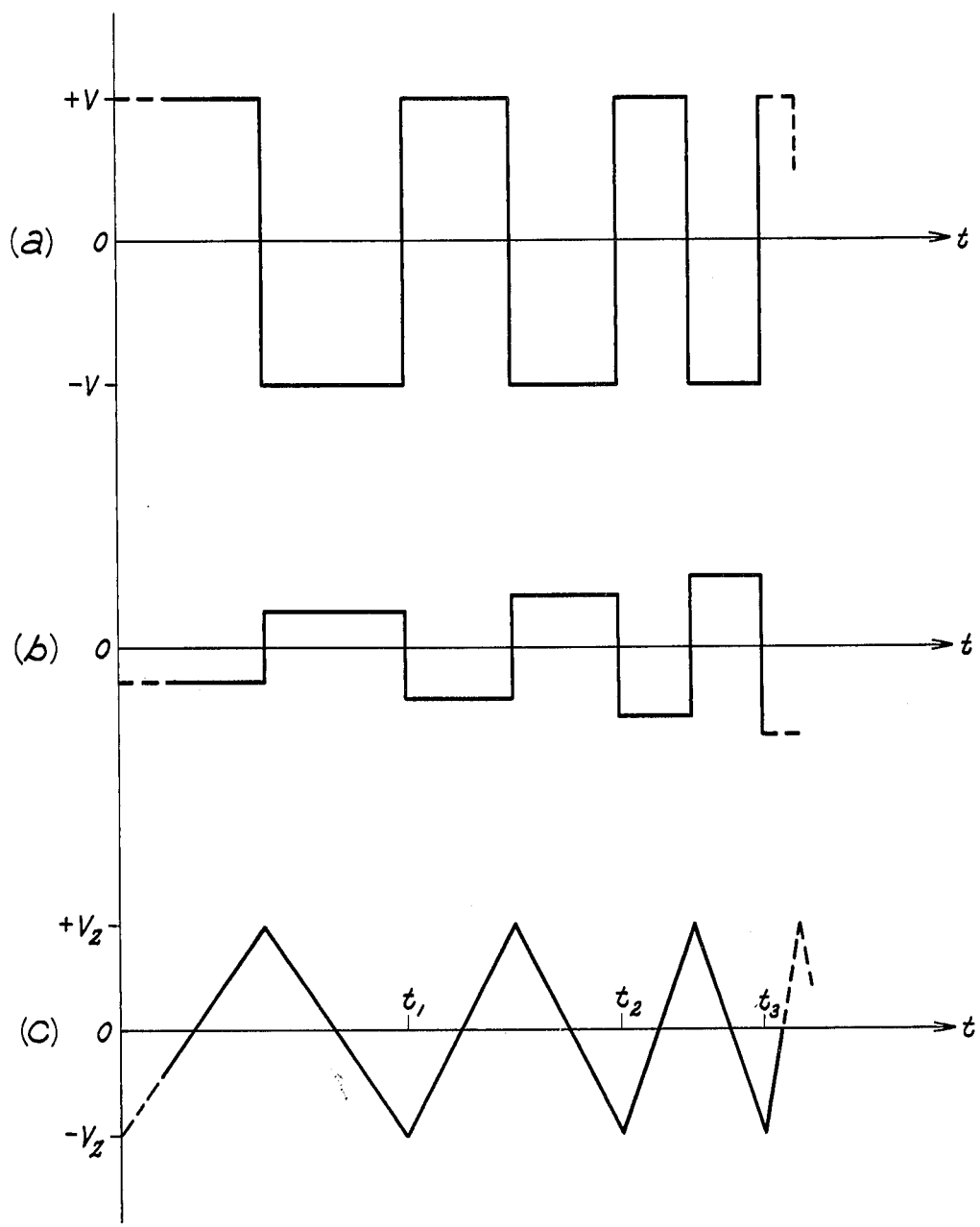

APPARATUS AND METHOD FOR DOWN HOLE VIBRATION SPECTRUM ANALYSIS

BACKGROUND OF THE INVENTION

1. Field of the Invention

This invention relates to down hole analysis of vibrations of a portion of a drill string in a bore hole and particularly to an apparatus and method for detecting and measuring vibrations of the drill bit.

2. Description of the Prior Art

During drilling operations it is often desirable to measure the frequencies and magnitudes of the vibrations of a portion of a drill string and particularly of the drill bit since such information may be utilized, inter alia, to determine the hardness and porosity of subsurface strata through which the bit is cutting and the amount of wear undergone by the bit. Although various devices are known for measuring drill string vibrations, they lack the capability of directly measuring drill bit vibrations and transmitting data describing these vibrations to the surface. Devices are known, for example, which include a transducer and recording apparatus located in the drill string adjacent the drill bit and which make a record of all vibrations experienced by the bit as it bores into the earth, but this information is not available on the surface until the recording apparatus is brought to the surface. It is also known to measure vibrations of the drill string at the surface, but as the bit bores deeper into the earth and the drill string increases in length measurements taken at this location become less representative of drill bit vibrations, because of the attenuation and distortion of these vibrations as they propagate up the drill string.

The primary problem that must be solved to enable real time transmission of data describing drill bit vibrations to the surface is that of transmitting a signal containing a range of frequency components through a medium of non-uniform attenuation without loss of fidelity. Specifically, the vibrations experienced by the drill bit are represented by a complex waveform including many frequency components. Transmission of such a signal to the surface through an available medium such as wiring running the length of the drill string must be accomplished without the distortions normally caused by the medium's attenuation of different frequency components by differing amounts.

It is the primary object of the present invention to overcome this problem and to provide an apparatus and method for down hole detection and measurement of vibrations of a portion of a drill string and for producing signals representative of these vibrations which can be transmitted to the surface without a loss of fidelity.

It is a further object of the present invention to provide such an apparatus which may be remotely controlled to measure vibrations of selected frequencies.

SUMMARY OF THE INVENTION

The present invention, in one form thereof, utilizes a band-pass filter to monitor only a portion of the frequency range of the vibrations at one time and repetitively steps the pass band of the filter through the entire frequency range. The magnitudes and frequencies of the vibrations occurring in each pass band are represented by two DC signals which are not subject to distortion by non-uniform attenuation characteristics of the medium utilized to transmit the signals to the surface.

The apparatus utilized to perform the down hole vibration analysis comprises the band-pass filter and digital control circuitry. The filter includes amplifiers whose gains are determinative of the pass band of the filter. The gains are controlled by analog signals produced by D/A converters in response to a multibit digital signal. This digital signal is produced by a counter in the control circuitry and corresponds to a count contained therein. The pass band of the filter is repetitively stepped through the frequency range of the vibrations by repetitively incrementing the counter through a range of counts corresponding to the frequency range. This incrementing is effective by a toggling means utilized to increment the counter. The toggling means is enabled by a SCAN signal applied to an input thereof and is inoperative in the absence of this signal. The filter may be operated continuously at a selected pass band by removing the SCAN signal after the filter has been stepped to this pass band by the counter.

The two DC signals representative of the magnitudes and frequencies of the vibrations are produced by the band-pass filter and the digital control circuitry, respectively. The first signal, designated VIBE A, is a measure of the peak magnitude of vibrations occurring at frequencies falling within the pass band at which the filter is presently operating. The second signal, designated VIBE F, is derived from the multibit digital signal and is representative of the center frequency of the pass band at which the filter is presently operating.

BRIEF DESCRIPTION OF THE DRAWINGS

FIG. 2 is a block diagram of the embodiment of the spectrum analyzer.

FIG. 3 illustrates the waveforms of signals produced by the spectrum analyzer of FIG. 2.

DESCRIPTION OF THE PREFERRED EMBODIMENT

A vibration spectrum analyzer constructed in accordance with the present invention is located in a casing which is placed within the hollow interior of a drill string. Typically, the casing contains additional electronic devices such as recording equipment and temperature sensors and the devices are electrically connected to equipment on the surface by wiring running the length of the drill string.

Figure 1:
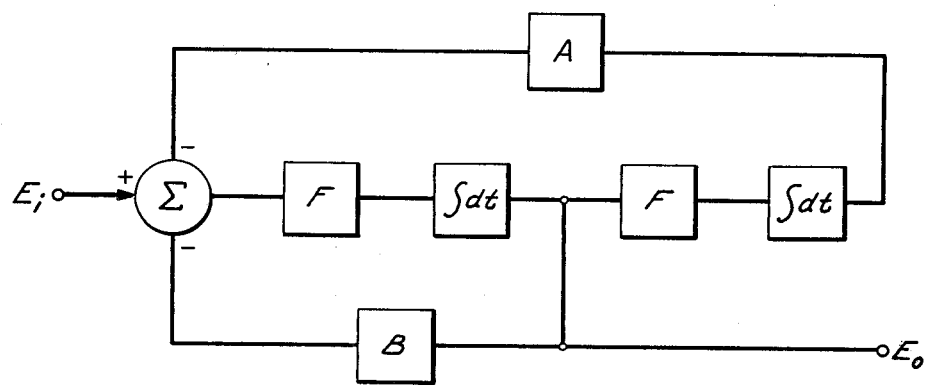
FIG. 1 is a schematic illustration of a band-pass filter utilized in an embodiment of the spectrum analyzer of the present invention.

A filter utilized in the analyzer is illustrated in FIG. 1. Excluding the elements F, the filter is basically an active band-pass filter resembling that described on pages 289 through 293 in a text by Wait, Huelsman and Korn entitled "Introduction to Operational Amplifier Theory and Applications" (1975). The effects of inclusion of the elements F may be determined by studying the transfer function for the filter of FIG. 1. An equation expressing this function in the complex frequency domain may be written;

$$H(s) = \frac{E_o}{E_i} = \frac{F/S}{1 + B(F/S) + A(F/S)^2} \quad (1)$$

$$= \frac{FS}{S^2 + BFS + AF^2}$$

where $E_i$ is the voltage of an electrical input signal including a plurality of frequency components, $E_o$ is the voltage of an electrical output signal which is proportional to the amplitude of components of the input signal having frequencies falling within the pass band of the filter and A, B and F are the gains of amplifiers in the filter.

The generalized transfer function for second-order band-pass filters is:

$$H(s) = \frac{KS}{S^2 + 2\zeta\omega_o S + \omega_o^2} \quad (2)$$

where $\omega_o$ is the center frequency expressed in radians per second and $2\zeta\omega_o$ is a measure of the bandwidth of the filter. Comparing equation (2) to equation (1) it can be seen that the A, B and F coefficients determine the filter characteristics as follows:

Bandwidth $(BW) = BF$

Center Frequency $(\omega_o) = \sqrt{A} \ F$ $$Q = \frac{\omega_o}{BW} = \frac{\sqrt{A} \ F}{BF} = \frac{\sqrt{A}}{B}$$

Thus, the center frequency is directly proportional to F and the Q of the filter is independent of F. If A and B are held constant and F is allowed to vary, a variable center frequency, constant Q, band-pass filter results. This single filter may be utilized for a variety of purposes varying from spectrum analysis to detection of a selected frequency component, but it admirably fulfills the requirement of a small vibration spectrum analyzer operable over a wide range of frequencies in a down hole environment.

Adaptation of the filter of FIG. 1 for use in a vibration spectrum analyzer is illustrated in block diagram form in FIG. 2. Unless otherwise noted, all components represented by the blocks in FIG. 2 are either purchased items or standard circuits which may be found in texts such as the Handbook of Operational Amplifier Circuit Design (1976) by David F. Stout. Comparing FIGS. 1 and 2, it can be seen that the filter is embodied in the lower half of the spectrum analyzer. The electrical input signal to the filter ($E_i$) is produced by a transducer 10 which is positioned to detect vibrations of a selected portion of the drill string. As used herein the term "drill string" includes all parts of the drilling apparatus contained within the borehole. As described in the present embodiment the selected portion is the drill bit adjacent which a transducer in the form of an accelerometer is positioned. The electrical signal produced by the accelerometer is representative of vibrations detected and is the previously mentioned input signal. This input signal is applied to a summing amplifier 12 corresponding to the summing element designated $\Sigma$ in FIG. 1. The two integrators 14 and 16 correspond to the integrating elements designated $\int dt$ in FIG. 1. The frequency gain control 18 and the band width gain control 20 are standard amplifiers having gains A and B, respectively, and correspond to elements A and B. A full wave peak detector 22 provides a data signal VIBE A representative of the peak amplitude reached by the filter output signal while the filter is operating at a particular center frequency and bandwidth. If the Q of the filter is selected to be very high so that the bandwidth is essentially limited to $\omega_o$, VIBE A is a measure of the peak magnitude of vibrations detected by the accelerometer 10 which are of frequency $\omega_o$. If the Q is selected to be moderate, VIBE A is a measure of the peak magnitude of vibrations occurring at all frequencies within the pass band of the filter.

The two multiplying D/A converters 24 and 26 correspond in part to the elements F in the schematic diagram of the filter, and provide means for digitally selecting the center frequency of the filter. The multiplying D/A converters each receive the same 12-bit digital signal from a data bus shown in heavy line form on the block diagram. This digital signal is representative of a number N which is linearly related to a desired filter center frequency. The converters function to convert the digital signal to an analog signal and to utilize this analog signal to control an amplifier contained therein such that its gain F is linearly related to the number N. The amplifiers in the converters correspond to the elements F in FIG. 1. Since the center frequency $\omega_o$ of the filter's pass band is proportional to F, which is linearly related to N, the center frequency can be changed by merely changing the digital signal to represent a different number N.

The portion of the spectrum analyzer providing digital control of the filter is illutrated in the upper half of the block diagram of FIG. 2. This control portion includes a digital counter 30, a D/A converter 32 and toggling means comprising an inverting multiplying D/A converter 34, an inverting integrator 36, a comparator 38 and switching means 40. The counter increments one count each time the switching means switches from a nonconducting state where a logical 1 is applied to a terminal C of the counter to a conducting state where a logical 0 is applied to terminal C. The counter is programmed to repeatedly count from a lower number $N_1$ to an upper number $N_2$. The counter produces the previously mentioned multi-bit digital signal which corresponds to the count contained therein and is representative of the number N which is linearly related to the center frequency $\omega_o$ of the filter's pass band. This digital signal is applied to D/A converter 32 which produces an analog data signal VIBE F having an amplitude proportional to $\omega_o$.

Both VIBE A and VIBE F are DC signals. It is this characteristic that enables the transmission of information relating to a wide range of frequency components over long wires without subjecting the signals to the non-uniform attenuation across this range that would be experienced by a broadband AC signal such as that produced by the accelerometer.

The switching means alternates between the non-conducting and the conducting states at a rate which is controlled by a toggling signal produced by the comparator 38 as a result of the comparator's interaction with the inverting multiplying D/A converter 34 and the inverting integrator 36. As will now be explained, this toggling signal which is illustrated in FIG. 3(a) characteristically alternates between positive and negative amplitudes of constant magnitude V at a rate which is a function of the count contained in the counter.

The toggling signal from the comparator is applied to the inverting multiplying D/A converter 34 which includes an amplifier of gain R and D/A conversion means. The conversion means receives the digital signal produced by the counter from the data bus and converts it to an analog signal which it utilizes to control the gain R such that it is linearly related to the number N. An amplified signal alternating between positive and negative amplitudes of magnitude RV is produced by the amplifier in converter 34 and applied to the inverting integrator 36. This amplified signal which is illustrated in FIG. 3(b) is 180° out of phase from the toggling signal and has a similar waveform, but the amplitude of the amplified signal is progressively increased each time the counter is incremented causing the gain R to increase. This increase in amplitude occurs each time the toggling signal alternates from the negative amplitude $-V$ to the positive amplitude $+V$, since it is at this instant that the switching means increments the counter.

The amplified signal produced by the amplifier in the converter is received by the integrator 36 which produces an alternating ramp signal as illustrated in FIG. 3(c). The slope of the ramp signal has the opposite sign as the instantaneous polarity of the amplified signal. That is, the ramp signal increases in the positive direction when the signal produced by the converter 34 is of negative polarity $(-RV)$ and increases in the negative direction when it is of positive polarity $(+RV)$. The ramp signal increases at a rate proportional to the magnitude RV of the signal received by the integrator and this magnitude increases each time the gain of the amplifier in converter 34 is increased. Three of these times ($t_1$, $t_2$, $t_3$) are indicated in FIG. 3(c).

The ramp signal is received by the comparator 38 where the signal's instantaneous magnitude is constantly compared with the magnitude of a reference signal. This reference signal, which is also produced by the comparator, alternates synchronously with the toggling signal between positive and negative amplitudes of magnitude $V_z$ and is maintained at the same instantaneous polarity as the toggling signal. The ramp signal magnitude is allowed to increase until it is equal to $V_z$ at which time the comparator reverses the polarities of the toggling signal and the reference signal. This causes the polarity of the signal received by the integrator to reverse and the sign of the ramp signal's slope to change. Thus, if the ramp signal's magnitude is increasing in a positive direction, when its voltage becomes equal to the reference signal amplitude of $+V_z$ it reverses direction and increases negatively until it reaches the new reference signal amplitude of $-V_z$. When the ramp signal magnitude becomes equal to $-V_z$ the polarities of the toggling signal and the reference signal again reverse and the ramp signal begins increasing positively toward $+V_z$. This alternation of the signals continues repetitively at a continually increasing rate as the progressively increasing gain R of the amplifier in converter 34 causes a proportionate progressive increase in the slope of the ramp signal.

Figure 4:
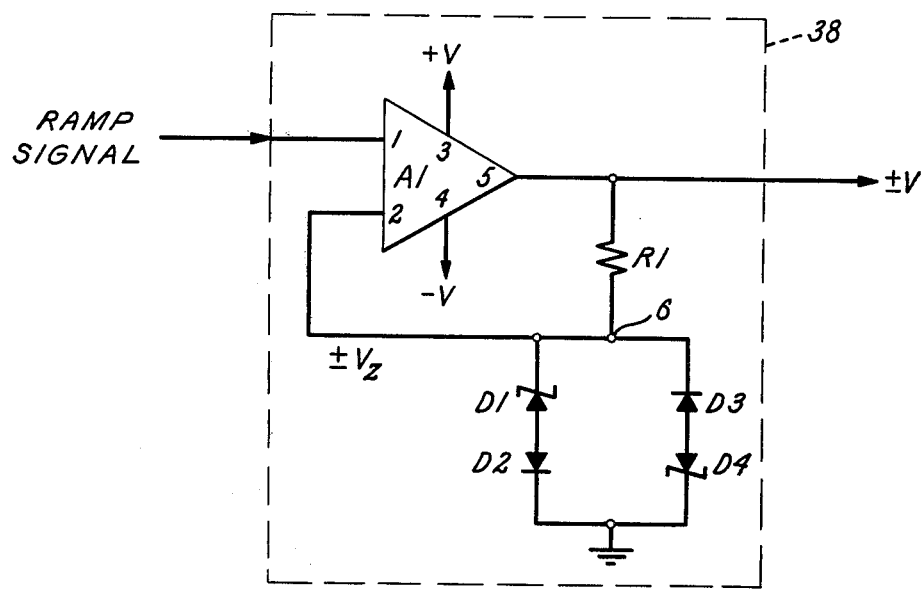
FIG. 4 is a schematic illustration of a comparator utilized in the spectrum analyzer of FIG. 2.

The circuit of the comparator 38 is illustrated in FIG. 4. The circuit includes an operational amplifier A1 connected to operate as a switch. Sources of positive voltage ($+V$) and of negative voltage ($-V$) are connected to terminals 3 and 4, respectively. In this switching configuration, the output voltage produced by the amplifier and provided at terminal 5 is either the positive voltage $+V$ or the negative voltage $-V$ depending on the relative voltages of the ramp signal and the reference signal applied to terminals 1 and 2, respectively.

The reference signal is provided by a resistor and diode arrangement connected between output terminal 5 of the amplifier and ground. This arrangement includes a resistor R1 connected in series with a parallel combination of diode pairs. One diode pair includes Zener diode D1 and rectifying diode D2 connected back to back and polarized to develop the positive voltage $+V_z$ at a junction 6 when amplifier A1 is producing the positive voltage $+V$. The other diode pair includes rectifying diode D3 and Zener diode D4, also connected back to back, and polarized to develop the negative voltage $-V_z$ at junction 6 when the amplifier is producing the negative voltage $-V$.

Junction 6 is electrically connected to input terminal 2 of amplifier A1 to provide the reference signal against which the ramp signal is compared. Each time the increasing ramp signal voltage applied to terminal 1 becomes equal to the voltage of the reference signal applied to terminal 2 the amplifier reverses the polarity of its output voltage at terminal 5 causing the polarity of the reference signal to reverse.

Figure 5:
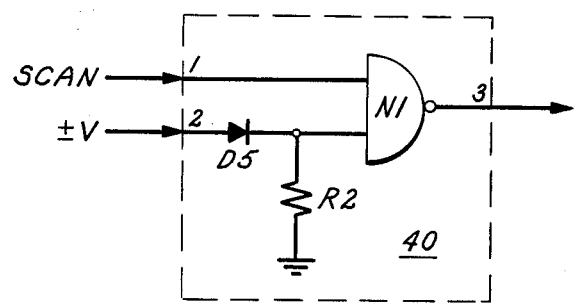
FIG. 5 is a schematic illustration of a switching means utilizing in the spectrum analyzer of FIG. 2.

The toggling signal produced by comparator 38 is applied to an input terminal 2 of the switching means 40 which is illustrated in schematic form in FIG. 5. This input terminal is connected through a rectifying diode D5 to a first input of a NAND gate N1. This first input is also connected through a resistor R2 to ground. The diode and the resistor function to half-wave rectify the bipolar toggling signal and reference the first input to ground. The resulting signal applied to the gate alternates between approximately $+V$ and ground as the toggling signal alternates between $+V$ and $-V$. The NAND gate recognizes a positive voltage applied to its inputs as a logical 1 and recognizes a ground applied to its inputs as a logical 0. If a signal designated SCAN, which is applied to a terminal 1 of the switching means, is maintained at a logical 1 the NAND gate switches into a conducting state producing a logical 0 at its output whenever the toggling signal alternates to its positive polarity. Conversely, the gate switches to its nonconducting state producing a logical 1 at its output whenever the toggling signal alternates to its negative polarity. The NAND gate output is connected via terminal 3 of the switching means to terminal C of the digital counter 30 to effect incrementing of the counter as previously described.

The SCAN signal is a logical 1 enabling signal which must be present for the switching means to alternate between states in response to alternations of the toggling signal. In the absence of the SCAN signal a logical 0 is present at terminal 1 of the switching means and the output of the NAND gate is held at a logical 1 irrespective of the polarity of the toggling signal. Thus, the counter may be prevented from incrementing by removing the SCAN signal from terminal 1 of the switching means. The count contained in the counter when the SCAN is removed is then maintained and the gain of the amplifier in converter 34 is held constant. Consequently, the rate at which the toggling signal alternates is held constant until the SCAN signal is reapplied.

From the above description it should be realized that the rate at which the counter increments is dependent on the rate at which the toggling signal alternates and that the rate at which this alternation occurs is proportional to N. Thus, the counter increments at an ever increasing rate as the count contained therein progresses from $N_1$ to $N_2$. The purpose for increasing the rate of incrementing in this manner is to allow the band-pass filter to operate for longer periods at lower center frequencies where slower vibrations detected by the accelerometer take a longer period of time to reach peak magnitude, but to operate for progressively shorter periods of time as the center frequency increases to higher values where faster vibrations take progressively lesser periods of time to reach peak magnitudes. Stepping the center frequency of the filter at this ever increasing rate enables the spectrum analyzer to sweep from a lower frequency to an upper frequency in a minimum period of time while allowing sufficient time for detecting peak magnitudes of vibrations occurring in each frequency band monitored by the filter. Sweeping may be stopped when the filter is stepped to a desired center frequency by simply removing the SCAN signal when VIBE F indicates that the analyzer has stepped to the desired frequency. During operation, the data signals produced by the vibration spectrum analyzer are typically either recorded in equipment located in the casing containing the analyzer and retrieved later or transmitted over the wiring running the length of the drill string to the surface equipment for real time processing. In either case operation of the analyzer is essentially the same, but because of the advantages of real time processing, operation of the analyzer under the control of surface mounted equipment will be described.

Before inserting the analyzer in the casing, the range of frequencies over which vibrations of the drill string are expected for the particular rate at which the drill string is rotated must be determined. A specific spectrum analyzer adjusted to cover this frequency range is then selected for use. The gains A and B of amplifiers 18 and 20 are adjusted to establish the Q of the band-pass filter and the gain F of the amplifier in converters 24 and 26 is adjusted to tune the filter to a center frequency corresponding to a specific count held in counter 30. The range of frequencies covered by the analzyer may be adjusted by programming the counter to repeatedly count from a lower number $N_1$ to an upper number $N_2$ corresponding to the lower and upper frequencies of the desired range.

Typically, the lowest vibrational frequency developed by the drill string occurs as the drill bit passes through the material of least hardness encountered and the highest frequency developed occurs as the bit passes through the material of greatest hardness encountered. The vibrational frequency representative of the rotational speed of the drill bit generally falls between the highest and lowest frequencies developed and its magnitude is representative of drill bit wear.

The Q of the filter is selected to allow measurements to be made at a plurality of bands which are narrow with respect to the range of frequencies covered, but wide enough to ensure detection of vibrations at the rotational speed of the drill bit despite deviations of this speed from the nominal value. This is important, since bit wear is measured by monitoring the magnitude of vibrations occurring when the filter is operating at the center frequency representative of the nominal rotational speed of the drill bit and such measurement would be difficult if the band was not wide enough to encompass deviations in frequency corresponding to the deviations in rotational speed experienced.

After inserting an appropriately adjusted vibration spectrum analyzer into the casing and installing the casing within the drill string, the analyzer is connected to the surface equipment by the drill string wiring and the drill string is pressed into service boring into the earth. The wiring carries electrical power and the SCAN signal from the surface equipment to the analyzer and the VIBE F and VIBE A signals from the analyzer to the surface equipment. As the drill string bores into the earth, the analyzer continually steps through the entire range of pass bands for which it is programmed detecting all vibrations in this range and transmitting analog data representative of the frequencies and magnitudes of these vibrations to the surface equipment in the form of the VIBE F and VIBE A signals, respectively.

Since the vibrations of a drill string are of a continuous nature, there is little chance that any frequency components thereof will be lost in the time required for the filter to be stepped to the pass band in which these components lie. Each time the filter is stepped to a pass band in which vibrational frequency components exist the electrical input signal from the accelerometer 10 representing these components is passed through the filter and the peak amplitude is measured by peak detector 22 which provides the output signal VIBE A. This signal is a DC voltage having an amplitude proportional to the peak magnitude of the vibrations. The amplitude of the VIBE F signal is representative of the present center frequency of the filter, since it is an analog representation of the digital signal which determines the center frequency. When transmitted to the surface with the VIBE A signal, the VIBE F signal provides data that may be used to determine both the pass band at which the filter is presented operating and the frequencies of vibrations having the magnitude represented by VIBE A.

If it is desired to hold the filter at a particular pass band this may be accomplished by simply causing the surface equipment to remove the SCAN signal when the amplitude of VIBE F reaches the voltage representative of the center frequency of the desired band. One application of this capability would be to monitor the peak magnitude of vibrations occurring at the frequency corresponding to the rotational speed of the drill string. This magnitude is representative of drill bit wear and can be utilized to determine when to replace the bit.

It can be seen from the above description that the spectrum analyzer of the present invention is capable of detecting and measuring vibrations of a drill bit located in a bore hole below the surface of the earth and transmitting this information to the surface for real time processing. The analyzer is capable of measuring vibrations over a wide frequency range, but utilizes only a single narrow band filter and is of minimal size enabling it to be encased within a drill string near the drill bit. The analyzer is also capable of transmitting the information over wires extending the entire length of the drill string without loss of fidelity. These capabilities have been obtained by digitally stepping the filter through a plurality of pass bands and converting the vibrational information measured at each pass band to DC signals not subject to the characteristic non-uniform attenuation of wide band signals transmitted over a long line. The analyzer can also be remotely controlled from the surface and this capability may be utilized to cause continuous monitoring of vibrations in a selected frequency band.

Although a specific embodiment of the analyzer has been disclosed, it is not intended that the invention be restricted to the specific circuitry or signal format utilized. Rather, the analyzer may be modified in manners obvious to one skilled in the art subject only to the limitations imposed by the appended claims. For example, a different band-pass filter capable of having its center frequency controlled in the manner claimed may be utilized. Other obvious changes include conversions of the analog data signals to digital format and transmission of the data signals along the same wires as other signals by the use of multiplexing techniques.

I claim:

1. Apparatus for detecting and measuring vibrations of a selected portion of a drill string in a bore hole comprising:
   (a) a transducer for detecting vibrations of said portion and producing an electrical input signal of voltage $E_i$ representative thereof;
   (b) a band-pass filter to which the input signal is applied, said filter including a plurality of amplifiers and having a transfer function:

$$H(s) = \frac{E_o}{E_i} = \frac{FS}{S^2 + BFS + AF^2}$$

where $E_o$ is the voltage of an output signal produced by the filter, $E_i$ is the voltage of the input signal and A, B and F are the gains of amplifiers in the filter, where the ratio $\sqrt{A/B}$ is determinative of the Q of the filter and F is determinative of the center frequency of the pass band, and where $E_o$ is proportional to the amplitude of components of the input signal having frequencies falling within the pass band of the filter;
   (c) counting means for producing a multi-bit digital signal corresponding to a count contained therein and representative of a number N;
   (d) toggling means for causing the counting means to change the count contained therein;
   (e) digital-to-analog conversion means for receiving the digital signal and for utilizing said signal to control the gain F such that the center frequency of the pass band is linearly related to N; and
   (f) means for receiving the filter output signal and producing a signal representative of the peak magnitude of vibrations occurring at frequencies within the pass band of the filter.

2. Apparatus as in claim 1 where the transducer is an accelerometer sensing any or all of 3 mutually orthogonal axes.

3. Apparatus as in claim 1 where the center frequency of the pass band is proportional to F and the Q of the filter is proportional to $\sqrt{A/B}$.

4. Apparatus as in claim 1 where the toggling means causes the counter to change the count contained therein at a rate linearly ralated to N.

5. Apparatus as in claim 4 where the toggling means comprises:
   (a) an amplifier of gain R for amplifying a toggling signal developed by the toggling means, said toggling signal alternating between positive and negative amplitudes of magnitude V, and producing an amplified signal alternating between positive and negative amplitudes of magnitude RV;
   (b) digital-to-analog conversion means for receiving the digital signal and converting it for utilizing said signal to control the gain R of the amplifier so that the gain is linearly related to the number N;
   (c) an integrator for receiving the amplified signal and for producing a ramp signal increasing in a direction determined by the polarity of the amplified signal and at a rate proportional to the magnitude of the amplified signal;
   (d) a comparator for producing the toggling signal and a reference signal synchronously alternating between positive and negative amplitudes of predetermined magnitudes, said comparator receiving the ramp signal and reversing the polarities of the toggling signal and the reference signal when the ramp signal magnitude becomes equal to that of the reference signal amplitude; and
   (e) switching means for receiving the toggling signal and alternating between conducting and non-conducting states at a rate which is controlled by the toggling signal, said switching means having an output connected to an input of the counting means and causing the count contained therein to change each time said switching means switches into a predetermined one of said states.

6. Apparatus as in claim 5 where the switching means alternates between conducting and non-conducting states in synchronism with alternation of the toggling signal between positive and negative polarities.

7. Apparatus as in claim 5 where the switching means includes a first input for receiving the toggling signal and a second input for receiving a SCAN signal, said switching means being disabled from changing states in the absence of said SCAN signal.

8. Apparatus as in claim 5 where the reference signal is maintained at the same instantaneous polarity as the toggling signal.

9. A method for detecting and measuring vibrations of a selected portion of a drill string in a bore hole comprising:
   (a) positioning a transducer adjacent the selected portion for detecting the vibrations and producing an electrical input signal of voltage $E_i$ representative thereof;
   (b) applying the input signal to a band-pass filter, said filter including a plurality of amplifiers and having a transfer function:

$$H(s) = \frac{E_o}{E_i} = \frac{FS}{S^2 + BFS + AF^2}$$

where $E_o$ is the voltage of the output signal from the filter, $E_i$ is the voltage of the input signal, and A, B and F are gains of amplifiers in the filter, where the ratio $\sqrt{A/B}$ is determinative of the Q of the filter and F is determinative of the center frequency of the pass band, and where the amplitude of $E_o$ is proportional to the amplitude of components of the input signal having frequencies falling within the pass band of the filter;
   (c) producing a multi-bit digital signal representative of a number N;
   (d) using the digital signal to control the gain F such that the center frequency of the pass band is linearly related to N;
   (e) continually changing the digital signal to successively represent a plurality of numbers, thereby continually changing the center frequency of the pass band; and
   (f) producing from the filter output signal a signal representative of the peak magnitude of vibrations occurring at frequencies within the pass band of the filter.

10. A method as in claim 9, where the center frequency of the pass band is proportional to F and the Q of the filter is proportional to $\sqrt{A}/B$.

11. A down hole vibration analyzer adapted for positioning in a drill string comprising:
(a) a transducer for detecting vibrations and producing a signal representative of vibrations detected;
(b) a band-pass filter connected to receive the signal from said transducer and adjustable to successivly pass frequencies of said signal falling within different pass bands;
(c) means for measuring a characteristic of the passed signal and producing an output representative thereof; and
(d) control means connected to said band-pass filter to cause it to continually change to the next successive band to be passed.

12. A down hole vibration analyzer in accordance with claim 11 wherein:
said transducer is an accelerometer sensing any or all of three mutually orthogonal axes.

13. A down hole vibration analyzer in accordance with claim 11 wherein:
said means for measuring a characteristic of the passed signal and producing an output representative thereof is a peak detector.

* * * * *